US000001263H

United States Statutory Invention Registration [19]

[11] Reg. Number: H1263

[43] Published: Dec. 7, 1993

Kawasaki et al.

[54] IMAGE FORMING METHOD AND APPARATUS

[75] Inventors: Mikio Kawasaki, Hachioji; Masatoshi Iwata, Akishima; Noboru Hatakeyama, Sagamihara; Shinichi Ohtani; Kiyoshi Sato, both of Hachioji, all of Japan

[73] Assignee: Konica Corporation, Japan

[21] Appl. No.: 473,812

[22] Filed: Feb. 2, 1990

[30] Foreign Application Priority Data

Feb. 7, 1989 [JP] Japan ..... 1-27820
Apr. 11, 1989 [JP] Japan ..... 1-92656

[51] Int. Cl.[5] ..... G03C 5/18

[52] U.S. Cl. ..... 430/438; 430/466; 430/963

[58] Field of Search ..... 430/434, 438, 466, 499, 430/963

[56] References Cited

U.S. PATENT DOCUMENTS

| | | | |
|---|---|---|---|
| H674 | 9/1989 | Nagasaki et al. | 430/966 |
| 2,228,762 | 1/1941 | Hafstein et al. | 430/434 |
| 3,615,488 | 3/1970 | Drago et al. | 430/438 |
| 3,637,389 | 1/1972 | Hofman | 430/963 |
| 4,030,924 | 6/1977 | Hofman | 430/963 |
| 4,561,745 | 12/1985 | Kinsman et al. | 430/963 |
| 4,810,622 | 3/1989 | Yamada et al. | 430/438 |
| 4,861,702 | 8/1989 | Suzuki et al. | 430/966 |
| 4,868,098 | 9/1989 | Steiger et al. | 430/963 |
| 4,897,340 | 1/1990 | Ohtani et al. | 430/403 |

FOREIGN PATENT DOCUMENTS

| | | | |
|---|---|---|---|
| 637704 | 3/1962 | Canada | 430/434 |
| 663837 | 5/1963 | Canada | 430/434 |
| 271309 | 6/1988 | European Pat. Off. . | |
| 1447043 | 4/1962 | Fed. Rep. of Germany | 430/434 |
| 1397977 | 6/1975 | United Kingdom . | |

OTHER PUBLICATIONS

Crabtree et al., "Rapid Processing of Photographic Materials," J. Phot. Soc. Amer. pp. 541–550, 1944.
Burkin, "Ultra-rapid processing of photographic materials," Phot. J., pp. 108–111, 1947.
Crabtree, "Rapid Processing of Films and Papers," PSA Journal, vol. 15, Feb. 1949, pp. 130–136.
Journal of SMPTE, Rapid Spray Film Processor, 1959, p. 444.
Abstract, "New Method of Development . . . ," Lovichi, 1945.

*Primary Examiner*—Philip Tucker
*Attorney, Agent, or Firm*—Finnegan, Henderson, Farabow, Garrett & Dunner

[57] ABSTRACT

An image forming method and its apparatus are disclosed. The method comprises exposing a light-sensitive silver halide photographic material having a support and hydrophilic colloid layers provided on both sides of the support and developing the exposed material with a developing solution without immersing it in the developing solution. The apparatus comprises (a) a pair of rollers for transporting the material in a downward direction and (b) a pair of nozzles for feeding the developing solution to both sides of the material, the nozzles being provided above the rollers.

16 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMAGE FORMING METHOD AND APPARATUS

FIELD OF THE INVENTION

The present invention relates to an image forming method by which a light-sensitive silver halide photographic material having a hydrophilic colloid layer exposed to light is photographically processed. More particularly, it relates to an image forming method that may cause no development uneveness.

BACKGROUND OF THE INVENTION

Light-sensitive silver halide photographic materials have been hitherto commonly processed with an automation processor. For example, a light-sensitive silver halide photographic material is imagewise exposed to light, which is thereafter delivered through a roller transport system, and then immersed for a given time in a developing solution held in a developing tank. An image is thus obtained.

Problems involved in such photographic processing are such that the effective components in the developing solution held in the developing tank undergo exhaustion deterioration in the course of running processing; developing agents are inactivated because of their oxidation with time; and the developing solution suffers exhaustion with time as a result of a lowering of the degree of alkalinity as in the case of an alkaline developing solution, which absorbs carbon dioxide in the air to cause neutralization.

As techniques to prevent deterioration of such developing solution, a number of proposals have been made. For example, Japanese Patent Publications Open to Public Inspection (hereinafter referred to as Japanese Patent O.P.I. Publications) No. 144502/1975, No. 62004/1979, No. 115039/1980 and No. 12645/1981 disclose techniques in which a developer replenishing solution is continuously or intermittently supplied depending on the processing quantity so that the exhaustion deterioration of the developing solution can be recovered.

These techniques, however, have been all disadvantageous in that the initial, first developing solution components and the subsequent developing solution components may cause different development. This results, in a strict sense, in photographic processing with different performance for each development, bringing about inconstant finishing performance.

To cope with this, some may contemplate that the developing solution is fed to the exposure plane of a light-sensitive silver halide photographic material for its development processing, without immersing the light-sensitive silver halide photographic material in the developing solution held in a developing tank. In this instance, however, use of the developing solution in a large quantity results in economical disadvantages, and hence it is necessary to make it possible to carry out satisfactory development processing with use of the developing solution in an amount as small as possible.

The present invention was made on account of such actual circumstances, and aims at providing a method of processing a light-sensitive silver halide photographic material, that can achieve stable development processing without development by the exhausted developing solution and also can achieve satisfactory development processing with a smaller consumption of the developing solution.

SUMMARY OF THE INVENTION

A first object of the present invention is to provide an image forming method that may cause no development uneveness even when a light-sensitive silver halide photographic material with a large size is photographically processed in a developing solution-feeding development system, so designed as to cause less exhaustion deterioration of the developing solution.

A second object of the present invention is to provide a method of forming an image with low fog, high sensitivity and high density, in the above development system.

A third object of the present invention is to provide an image forming method that can always attain stable development performance.

Other objects of the present invention will become apparent from the following descriptions.

As a result of intensive studies, the present inventors have found that the above objects can be readily achieved by the invention as described below. The present invention has been thus accomplished.

The objects can be achieved by an image forming method comprising exposing a light-sensitive silver halide photographic material having a support and hydrophilic colloid layers provided on both sides of the support and developing the exposed material with a developing solution containing water and hydroquinone or hydroquinone derivatives without immersing the exposed material in the developing solution, wherein the water content of the material is 5 to 40 $g/m^2$ at the time development is completed.

The above objects can also be achieved by an image forming method comprising exposing a light-sensitive silver halide photographic material having a support and hydrophilic colloid layers provided on both sides of the support and developing the exposed material with a developing solution containing water and hydroquinone or hydroquinone derivatives without immersing the exposed material in the developing solution, wherein the contact angle of the material to the developing solution is not more than 20° at 25° C.

DETAILED DESCRIPTION OF THE INVENTION

Figure 1:
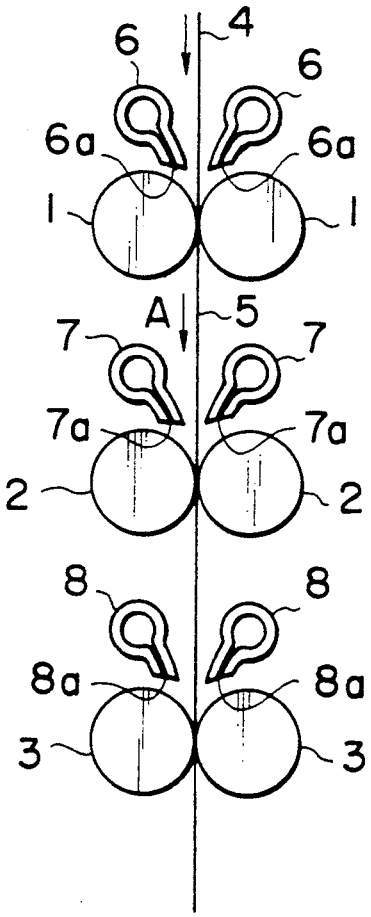
FIG. 1 is a cross section of a developing apparatus used in the image forming method according to the present invention.

The present invention will be described below in detail.

The image forming method of the present invention comprises feeding a hydroquinone-containing developing solution to the exposure plane of a light-sensitive silver halide photographic material comprising a support and hydrophilic colloid layers provided on its both sides, thereby carrying out developing processing without immersing the light-sensitive silver halide photographic material in the developing solution, and said developing processing is preferably carried out in the manner that the water content of the light-sensitive silver halide photographic material may be 5 $g/m^2$ to 40 $g/m^2$ at the time development is completed.

The water content of the material described above means substantially the same amount as the amount of a developing solution supplied on the material.

This light-sensitive silver halide photographic material is exemplified by a highly sensitive film such as an X-ray film, and comprises a support having at least hydrophilic colloid layers on its both sides. This support is formed of a transparent material.

The feeding of the developing solution to the both surfaces of the light-sensitive silver halide photographic material may preferably be carried out while the light-sensitive silver halide photographic material is transported. This light-sensitive material may be transported in the lateral direction or in the longitudinal direction. However, the feeding may preferably be carried out while the light-sensitive material is transported in the longitudinal direction so that the area for the installation of apparatus can be made smaller.

The longitudinal direction described above means a downward direction or an upward direction. A vertical direction is preferable, and more preferable is a vertically downward direction.

The feeding of the developing solution to this light-sensitive silver halide photographic material is carried out without immersing the light-sensitive silver halide photographic material in a developing solution held in a tank. Such feeding makes it possible to feed the developing solution in a given quantity required for the developing processing, so that the developing solution can be prevented from being exhausted with time and at the same time can be saved.

This feeding of the developing solution is carried out through a means of applying, showering or spraying the developing solution on the exposure plane of the light-sensitive silver halide photographic material. This feeding of the developing solution may be carried out at one time, or, without limitation thereto, may be divided into several times.

In the developing processing of the present invention, the temperature of the developing solution may range from 20° to 50° C., and preferably from 30° to 40° C. The developing time may range from 5 to 60 seconds, and preferably from 5 to 30 seconds.

The hydroquinones used in the developing solution of the present invention include hydroquinone, chlorohydroquinone, and methylhydroquinone, but it is preferred to use hydroquinone. This may be added in an amount of from 1 g to 35 g, and preferably from 5 to 30 g, per liter of the developing solution.

The developing solution of the present invention may also contain a developing agent of a 3-pyrazolidone type, a hardening agent of a dialdehyde type, an antifogging agent selected from an indazole type, a benzimidazole type, a benztriazole type and a mercaptothiazole type, a chelating agent, a buffering agent, an alkali agent, a dissolving aid, a pH adjustor, a development accelerator, and a surfactant, as disclosed in Japanese Patent O.P.I. Publication No. 10158/1988, which are optionally added.

In the present invention, the developing solution containing a hydroquinone is fed to the exposure plane of the light-sensitive silver halide photographic material comprising a support provided with hydrophilic colloid layers on its both sides, without immersing the light-sensitive silver halide photographic material in the developing solution. Since in this way the developing solution is fed without immersing the light-sensitive material in the developing solution held in a tank, the light-sensitive material can be processed by the developing solution that has undergone no development exhaustion resulting from the processing and no oxidation exhaustion caused by its contact with the air.

The present invention will now be described in detail with reference to the accompanying drawing.

FIG. 1 illustrates a development apparatus to which a working example of the present invention is applied.

In this development apparatus, delivery rollers 1, 2 and 3 each forming a pair are disposed in threefold stages in the vertical direction. A light-sensitive silver halide photographic material 4 having been exposed to light is forwarded in the direction of arrow A on the delivery path 5 formed by the delivery rollers 1 to 3, in the course of which the developing processing is carried out.

The upper stage, middle stage and lower stage are each constructed in the like way. Feed nozzles 6, 7 and 8 each forming a pair are provided above the delivery rollers 1 to 3 forming pairs. Feed openings 6*a* to 8*a* of the feed nozzles 6 to 8 are so disposed as to face to the contact surfaces of the delivery rollers 1 to 3 and also to be opposed to the surfaces of the rollers.

The light-sensitive silver halide photographic material 4 is delivered to the direction of arrow A by the driving of the delivery rollers 1 to 3. When this light-sensitive silver halide photographic material 4 is delivered, the developing solution is fed from the feed openings 6*a* to 8*a* of the feed nozzles 6 to 8. This developing solution flows in the direction of the contact surfaces of the delivery rollers 1 to 3 and is applied on both sides of the light-sensitive silver halide photographic material 4.

From the respective feed nozzles 6 to 8, a fresh developing solution is fed to the light-sensitive silver halide photographic material 4, falls from the upper delivery roller 1 to the lower part, and then falls from the middle delivery roller 2 to the lower part. It further falls from the delivery roller 3, and is then discarded. Thus, the developing solution may be thrown away.

However, a tray may be disposed beneath the delivery rollers 1 to 3 so that a developing solution which is not used for development may fall on the tray, and a pipe may be connected to the tray so that the developing solution in the tray may circulate to the feed nozzle with a pump. In this instance, the developing solution has undergone no development exhaustion resulting from the processing. Because the circulating developing solution comes into contact with the atmosphere in only a small contact area, the solution may undergo less deterioration with time, caused by absorption of carbon dioxide. Hence, it is also possible to reuse the developing solution.

The contact angle between the light-sensitive silver halide photographic material according to the present invention and the developing solution may preferably be not more than 20°, and more preferably in the range of from 10° to 20°, at room temperature (25° C.).

This contact angle refers to contact angle formed on the surface of a solid by the developing solution present at the outermost surface of the light-sensitive silver halide photographic material according to the present invention, and is a value that depends on the correlation between both the surface of a solid and the developing solution. Hence, it is also influenced by the type and amount of surface active agents used in the light-sensitive silver halide photographic material, as exemplified by all sorts of photographic surface active agents such as coating auxiliaries, antistatic agents, emulsifying dispersants, development accelerators, anti-foaming agents, lubricants, and plasticizers. Since, however, they are added in amounts within the range that the photographic performance may not be impaired, the contact angle to, for example, water makes not so great difference from that on a gelatin-coated surface, and thus there is commonly shown a value of about 30° at 30° C.

On the other hand, the developing solution is comprised of, for example, a developing agent and a preservative serving as its antioxidant agent, an alkali agent serving as an accelerator, an antifoggant, a hardening agent, a softener, and development accelerator, and a fresh solution commonly shows a surface tension of about 60 dyn/cm at 30° C.

In order to attain the contact angle of not more than 20° in the present invention, the surface tension in the state the developing solution is used is required to be not more than 45 dyn/cm, and more preferably not more than 40 dyn/cm at 30° C.

The surface active agent that can be used in the developing solution for lowering the contact angle to not more than 20° will be described below.

In the present invention, what are required for the surface active agent can be chiefly itemized as follows:

(1) It does not adversely affect the photographic performance.

(2) It readily dissolves in the developing solution and may not cause precipitation, deposition, suspension coloring, and so forth during the storage of the developing solution.

(3) It is inexpensive for the developing solution.

Known surface active agents, e.g., a nonionic surface active agent, an anionic surface active agent, a cationic surface active agent, and an amphoteric surface active agent, can be appropriately used without any particular selection, so long as they meet the above requirements, give the contact angle of not more than 20° according to the present invention, and also give a surface tension of not more than 45 dyn/cm at 30° C. to the developing solution having been just preprered (a fresh solution).

More specifically, the nonionic surface active agent includes, for example, glycerol fatty acid esters, polyoxyethylenes, sorbitan fatty acid esters, polyethylene glycols, alkyl ethers, polyethylene glycol fatty acid esters, and polypropylene oxyalkyl ethers.

The anionic surface active agent includes, for example, alkyl sulfates, sulfates, phosphates or acetates of polyoxyethylene alkyl ethers, N-amylamino acid salts, and methyl taurine types.

The cationic surface active agent includes alkyl ammonium salts, and the amphoteric surface active agent includes, for example, aminoacetic acid betaine types. Of these surface active agents, those preferably used in the present invention are the anionic, nonionic or amphoteric surface active agents.

Examples of specific compounds of the surface active agent used in the present invention are set out below, but the present invention is by no means limited by these.

| Compound No. | |
|---|---|
| 1: | Decaglyceryl monooleate |
| 2: | Decaglyceryl trioleate |
| 3: | Decaglyceryl pentaoleate |
| 4: | Decaglyceryl heptaoleate |
| 5: | Decaglyceryl decaoleate |
| 6: | Diglyceryl monooleate |
| 7: | Tetraglyceryl monooleate |

-continued

| Compound No. | |
|---|---|
| 8: | Tetraglyceryl pentaoleate |
| 9: | Hexaglyceryl monooleate |
| 10: | Hexaglyceryl pentaoleate |
| 11: | Polyoxyethylene (20) sorbitan monolaurate |
| 12: | Polyoxyethylene (20) monopalmitate |
| 13: | Polyoxyethylene (6) sorbitol tetraoleate |
| 14: | Polyoxyethylene (30) sorbitol tetraoleate |
| 15: | Polyoxyethylene (40) sorbitol tetraoleate |
| 16: | Polyoxyethylene (60) sorbitol tetraoleate |
| 17: | Polyoxyethylene (6) sorbitol monolaurate |
| 18: | Polyoxyethylene (10) monolaurate |
| 19: | Polyoxyethylene (2) monooleate |
| 20: | Polyoxyethylene (10) monooleate |
| 21: | Polyoxyethylene (4,2) lauryl ether |
| 22: | Polyoxyethylene (9) lauryl ether |
| 23: | Polyoxyethylene (20) stearyl ether |
| 24: | Polyoxyethylene (10) oleyl ether |
| 25: | Polyoxyethylene (3) secondary alkyl ether |
| 26: | Polyoxyethylene (5) secondary alkyl ether |
| 27: | Polyoxyethylene (7) secondary alkyl ether |
| 28: | Polyoxyethylene (9) secondary alkyl ether |
| 29: | Polyoxyethylene (12) secondary alkyl ether |
| 30: | Polyoxyethylene (1) Polyoxypropylene (4) } cetyl ether |
| 31: | Polyoxyethylene (1) Polyoxypropylene (8) } cetyl ether |
| 32: | Ethylene glycol mono-n-dodecyl ether |
| 33: | Diethylene glycol mono-n-dodecyl ether |
| 34: | Triethylene glycol mono-n-dodecyl ether |
| 35: | Triethanolamine lauryl sulfate |
| 36: | Polyoxyethylene (2) lauryl ether sulfate triethanolamine |
| 37: | Polyoxyethylene (4) nonylphenyl ether sodium sulfate |
| 38: | Lauroyl sodium sarcosine |
| 39: | Oleoyl sarcosine |
| 40: | Sodium N-cocoyl methyltaurate |
| 41: | Polyoxyethylene (3) alkyl ether sodium acetate |
| 42: | Polyoxyethylene (6) alkyl ether sodium acetate |
| 43: | Polyoxyethylene (4) lauryl ether sodium phosphate |
| 44: | Dipolyoxyethylene (4) alkyl ether phosphoric acid |
| 45: | Dipolyoxyethylene (6) alkyl ether phosphoric acid |
| 46: | Tripolyoxyethylene (2) alkyl ether phosphoric acid |
| 47: | Tripolyoxyethylene (4) alkyl ether phosphoric acid |
| 48: | Lauryldiemthyl aminoacetic acid betaine |
| 49: | Coconut oil acid amide propyldiemthylaminoacetic acid betaine |

The above compounds are known in the art as surface active agents, and can be obtained by, for example, the synthesis method as described in Hiroshi Horiguchi, SHIN KAIMENKASSEIZAI (New Surface Active Agent), Sankyo Shuppan, 1986. As commercially available products, they can also be readily obtained from Nikkol products (Nikko Chemicals, Co., Ltd.).

In the present invention, the surface active agent added in the developing solution may preferably be added therein after dissolved in water or a hydrophilic organic solvent as exemplified by methanol.

The amount for its addition depends on the contact angle, but may usually be from 0.01 to 50 g/l of developing solution, and more preferably from 0.05 to 30 g/l of developing solution, within which the effect of the present invention can be well exhibited.

The emulsion used in the light-sensitive silver halide photographic material having the hydrophilic colloid layer of the present invention can be prepared by the method known in the art. For example, the method may be used which is described in Research Disclosure (RD.) 17643, pp. 22–23, December 1978, 1. Emulsion Preparation and Types, and RD. 18716, p. 648, November 1979. A method of obtaining a core/shell emulsion is detailed in, for example, British Patent No. 1,027,146, U.S. Pat. No. 3,505,068 and U.S. Pat. No. 4,444,877, and Japanese Patent O.P.I. Publication No. 14331/1985.

More specifically, it can be prepared using a neutral method, an acidic method or an ammoniacal method that governs solution conditions, a normal precipitation method, a reverse precipitation method, a double jet method or a controlled double jet method that governs mixing conditions, a conversion method or a core/shell method that governs grain preparation conditions, or a combination of these.

A preferred embodiment of the present invention is a core/shell monodisperse emulsion comprising silver iodide locally incorporated inside the grain. Types of the silver halide used in such a core and a shell include silver iodide, silver iodobromide, silver bromide, or any of these in which a small amount of silver chloride is incorporated.

It is preferred for the shell to substantially comprise silver bromide or silver iodobromide, and it is advantageous for obtaining a high sensitivity that the core/shell emulsion finally formed comprises a silver iodobromide emulsion.

The shell of the core/shell emulsion according to the present invention may preferably comprise silver bromide or silver iodobromide as mentioned above, and may have a multi-layer structure of more than one layer. It may preferably have a layer structure with a whole thickness of 0.05 to 0.28 μm.

In contrast to the shell, the core locally incorporated with silver iodide may have silver halide composition comprising silver iodobromide having a silver iodide content of from 10 to 40 mol %, and preferably containing an iodide ion of from 20 to 40 mol %. The core may have a grain size of from 0.15 to 0.27 μm, and preferably from 0.15 to 0.25 μm.

In preparing core grains, silver and halide ions may preferably be added under conditions governed by a double jet method or a controlled double jet method.

In the emulsion of the present invention, a cadmium salt, a zinc salt, a lead salt, a thallium salt, an iridium salt or an iridium complex salt, a rhodium salt or a rhodium complex salt, an iron salt or an iron complex salt, or the like may optionally be present together in the course of physical ripening of the emulsion. The core grain may be of spherical, tabular or twinned-crystal form, or octahedral, tetradecahedral or cubic form, or mixed form of these.

As to the grain size distribution of silver halide, the emulsion may be either a monodisperse emulsion having a narrow distribution or a polydisperse emulsion having a broad distribution. As to the crystal structure of silver halide, the inside and outside may have different silver halide composition. An emulsion according to a preferred embodiment of the present invention is a core/shell monodisperse emulsion having clear two-layer structure comprised of the core locally incorporated with silver iodide and the shell having a low iodine content. Methods of preparing such a monodisperse emulsion are known in the art, as described in, for example, J. Phot. Sci. 12, pp. 242–251 (1963), Japanese Patent O.P.I. Publications No. 36890/1973, No. 16364/1977, No. 142329/1980 and No. 49968/1983, British Patent No. 1,413,748, and U.S. Pat. Nos. 3,574,628 and 3,655,394.

Particularly preferred as the above monodisperse emulsion is an emulsion in which grains have been made to grow by using seed crystals, which are used to serve as growth nuclei, and feeding silver ions and halide ions. Methods of obtaining core/shell emulsions are described in detail in, for example British Patent No. 1,027,146, U.S. Pat. Nos. 3,505,068, 4,444,877, and Japanese Patent O.P.I. Publication No. 14331/1985.

The silver halide emulsion used in the present invention may also be comprised of tabular grains having an aspect ratio of not less than 5.

Such tabular grains are advantageous in that the spectral sensitization efficiency can be improved and also the graininess and sharpness of an image can be improved, and can be prepared by the methods as described in, for example, British Patent No. 2,112,157, and U.S. Pat. Nos. 4,430,520, 4,433,048, 4,414,310 and 4,434,226.

The emulsion as described above may be any emulsion of a surface latent emulsion type, in which a latent image is formed on the surface of a grain, an internal latent image type, in which the latent image is formed in the inside of a grain, or a type in which the latent image is formed on the surface and in the inside.

In order to remove soluble salts, the emulsion may be subjected to washing with water as exemplified by noodle washing, flocculation precipitation, or ultrafiltration.

In the emulsion according to the present invention, various photographic additives can be used in the course of physical ripening or chemical ripening. Known additives include the compounds as disclosed in, for example, Research Disclosures No. 17643 (December 1978) and No. 18716 (November 1979).

kinds of the compounds disclosed in these two Research Disclosures and the paragraphs or columns in which they are described are shown in the following table.

| | RD-17643 | | RD-18716 | |
|---|---|---|---|---|
| Additives | Page | Paragraph | Page | Column |
| Chemical sensitizer: | 23 | III | 648 | right, upper |
| Sensitizing dye: | 23 | IV | 648<br>649 | right to<br>left |
| Development accelerator: | 29 | XXI | 648 | right, |
| Antifoggant: | 24 | VI | 649 | right, upper |
| Stabilizer: | 24 | VI | 649 | right, upper |
| Anti-color-stain agent: | 25 | VII | 650 | left to right |
| Image stabilizer: | 25 | VII | | |
| Ultraviolet absorbent: | 25–26 | VIII | 649<br>650 | right to<br>left |
| Filter dye: | 25–26 | VIII | 650 | left |
| Brightener: | 24 | V | | |
| Hardening agent: | 26 | X | 651 | right |
| Coating auxiliary: | 26–27 | XI | 650 | right |
| Surfactant: | 26–27 | XI | 650 | right |
| Plasticizer: | 27 | XII | 650 | right |
| Lubricant: | 27 | XII | | |
| Antistatic agent: | 27 | VII | 650 | right |
| Matting agent: | 28 | XVI | 650 | right |
| Binder: | 26 | IX | 651 | right |

In the light-sensitive material according to the present invention, the conventional developing solution as described in the above RD-17643, page 29, paragraph XX or RD-18716, page 651, left column can be used as a base.

The support that can be used in the light-sensitive material according to the present invention include, for example, the supports as described in RD-17643, page 28, and RD-18716, page 647, left column. Suitable supports include plastic films. The surfaces of these supports may commonly be provided with a subbing layer or subjected to ultraviolet irradiation so that the adhesion of coating layers can be improved. Then the support thus treated can be coated on one side or both sides thereof with the emulsion according to the present invention.

The present invention can be applied to all lighting-sensitive silver halide photographic materials, but is particularly suited for high-sensitive black and white or color light-sensitive materials.

In instances in which the present invention is applied to medical X-ray radiography, a fluorescent intensifying screen is used which is mainly composed of a fluorescent substance that emits near ultraviolet light or visible light as a result of exposure to transmitting radiations. This screen may preferably be brought into close contact with each side of a light-sensitive material coated on its both sides with the emulsion of the present invention, and then exposed to light.

The transmitting radiations herein mentioned refer to electromagnetic waves with a high energy, and are meant to be X-rays and gamma rays.

The fluorescent intensifying screen also refers to, for example, an intensifying screen mainly composed of calcium tungstate as a fluorescent component, or a fluorescent intensifying screen mainly composed of a rare earth compound activated with terbium.

EXAMPLES

The present invention will be demonstrated by giving Examples, but the working embodiments of the present invention are by no means limited by these.

EXAMPLE 1

Preparation of coating samples

Using the resulting solution as a mother liquor, an aqueous 3.2N ammoniacal silver ion solution was added therein by the double jet method.

More specifically, the pAg and pH were controlled to be 7.3 and 9.7, respectively, and a layer having a silver iodide content of 30 mol % was formed. Next, with the pH changed from 9 to 8.2 and the pAg kept at 9.0, grains were made to grow to 95% of grain size. Thereafter, a potassium bromide solution was added in 8 minutes through a nozzle, and then the pAg was lowered to 11.0. The mixing was completed 3 minutes after completion of the addition of the potassium bromide. The resulting emulsion had an average grain size of 0.7 μm and a silver iodide content of about 2.0 mol % of the whole grains.

Desalting was then carried out in order to remove excess soluble salts in the resulting reaction mixture. More specifically, the reaction mixture was maintained at 40° C., where 5 g/mol AgX of the compound (I) as shown later and 8 g/mol AgX of $MgSO_4$ were added. The mixture was stirred for 5 minutes and then left to stand. Thereafter, the supernatant was removed to give a liquid quantity of 200 cc per mol of AgX. Subsequently 1.8 l/mol AgX of water of 40° C. was added, and the mixture was stirred for 5 minutes. Next, 20 g/mol AgX of $MgSO_4$ was added, and, in the same way as the above, the mixture was stirred and then left to stand, followed by removal of the supernatant and then desalting. Next, the resulting solution was stirred, and a post gelatin for again dispersing AgX was added.

The emulsion thus obtained was maintained at 55° C., and the following sensitizing dyes (1) and (2) were added. Thereafter, ammonium thiocyanate, chloroauric acid, and sodium thiosulfate were added to effect gold-sulfur sensitization. After completion of sensitization, 4-hydroxy-6-methyl-1,3,3a,7-tetrazaindene was added.

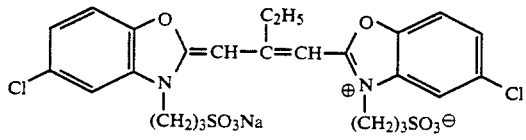

Sensitizing dye (1)

0.6 g/mol AgX

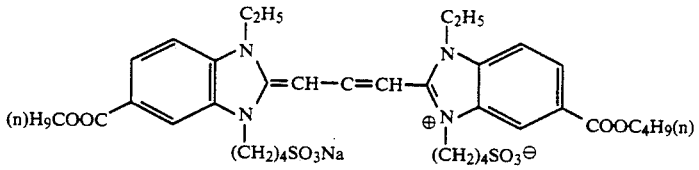

Sensitizing dye (2)

20 mg/mol AgX

While conditons are controlled to 60° C. pAg=8 and pH=2.0, a monodisperse cubic crystal silver iodobromide emulsion (A) having an average grain size of 0.3 μm and containing 2 mol % of silver iodide was obtained by the double jet method. An electron microscope photograph of this emulsion showed that twinned crystals were produced at a rate of not more than 1% in number. Using this emulsion (A) as a seed emulsion, grains were made to grow in the following way:

This seed emulsion (A) was dissolved in 8.5 l of a solution maintained at 40° C. and containing a protective gelatin and optionally ammonia, and also the pH was adjusted using acetic acid.

In this emulsion, 400 mg of t-butyl-catechol, 1.0 g of polyvinyl pyrrolidone (molecular weight: 10,000), 2.5 g of a styrene/maleic anhydride copolymer, 10 g of trimethylolpropane, 5 g of diethylene glycol, 50 mg of nitrophenyl-triphenylphosphonium chloride, 4 g of ammonium 1,3-dihydroxybenzene-4-sulfonate, 15 mg of sodium 2-mercaptobenzimidazole-5-sulfonate, 70 mg of

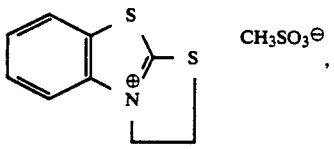

1 g of

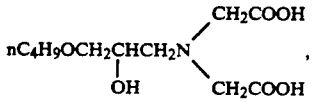

150 mg of

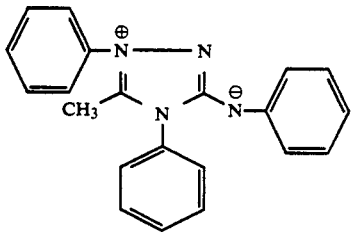

and 10 mg of 1,1-dimethylol-1-bromo-1-nitromethane, all per mol of AgX, were added as additives. Emulsion coating solutions were thus prepared.

As protective layer additives, the following compounds were also added. (The amount is expressed in terms of the amount per 1 g of gelatin.)

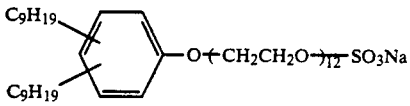

10 mg

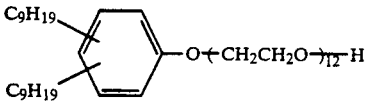

2 mg

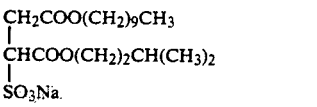

7 mg

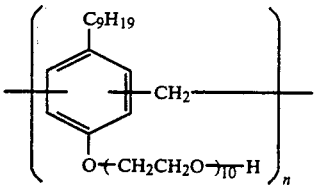

15 mg (a mixture of n is 2 to 5)

A protective layer coating solution was prepared with further addition of 7 mg of a matting agent comprised of polymethyl methacrylate with an average particle diameter of 5 μm, 70 mg of colloidal silica with an average particle diameter of 0.013 μm, 8 mg of $(CHO)_2$, and 6 mg of HCHO.

The resulting coating solutions were each coated on a 180 μm thick polyethylene terephthalate blue base having been subjected to subbing using an aqueous copolymer dispersion having 10 wt. % of a copolymer consisting of three monomers of 50 wt. % of glycidyl methacrylate, 10 wt. % of methyl acrylate and 40 wt. % of butyl methacrylate.

More specifically, the base was simultaneously provided on its each side with two layers of the emulsion layer and the protective layer in order from the support by double-layer coating, followed by drying to give samples. Thereafter, the samples were left to stand for 3 days in an atmosphere of 23° C. and 55% RH, and then the following development tests were carried out.

In each sample, the coated silver weight was 5 g/m$^2$ for both sides. The protective layer coating solution was coated using a 3% gelatin solution, in the manner that the coated gelatin weight including that of both the emulsion layer and protective layer was 6.5 g/m$^2$ for both sides.

The compound used in Example:

Compound (I)

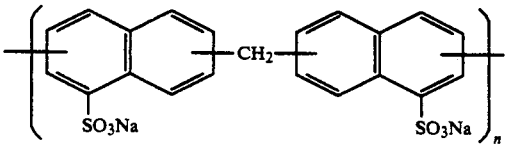

(n = 2.2)

Preparation of Processing Solutions

A developing solution and a fixing solution were prepared to have the following composition.

| Developing solution | |
|---|---|
| Potassium sulfite | 55 g |
| Hydroquinone | 25 g |
| 1-Phenyl-3-pyrazolidone | 1.2 g |
| Boric acid | 10.0 g |
| Sodium hydroxide | 21.0 g |
| Triethylene glycol | 17.5 g |
| 5-Nitrobenzimidazole | 0.10 g |
| Glutaldhyde bisulfite | 15.0 g |
| Glacial acetic acid | 16.0 g |
| Potassium bromide | 4.0 g |
| Triethylenetetraminehexaacetic acid | 2.5 g |
| Made up to 900 ml with water. | |

Thereafter, 10 g of the surface active agents as shown in Table 1 were each added, and the solution was made up to 1 l as a whole. (The sample in which the surface active agent was not added was made up to 1 l with water.)

| Fixing solution | |
|---|---|
| Ammonium thiosulfate | 130.0 g |
| Anhydrous sodium sulfite | 7.3 g |
| Boric acid | 7.0 g |
| Acetic acid (90 wt. %) | 5.5 g |
| Sodium acetate trihydrate | 25.8 g |
| Aluminum sulfate octadecahydrate | 14.6 g |
| Sulfuric acid (50 wt. %) | 6.77 g |
| Made up to 1 l with water. | |

Evaluation Method i) Contact angle

The contact angle between the resulting coated sample and the developing solution was measured using Kyowa Contact-Angle Meter, manufactured by Kyowa Chemical Co., Ltd.

ii) Surface tension

The surface tension of the developing solution was measured at 30° C.

iii) Development test

The developing solutions as shown in Table 1 were each controlled to have a temperature of 35° C., and fed to both sides in the unit as illustrated in FIG. 1 at a rate of 50 ml/min. The coated sample was passed between the rollers at a line speed of 10 cm/sec to carry out development. Next, the fixing solution was fed in the same way, followed by washing and drying, and then development uneveness was evaluated. At this time, a sample used for sensitometry was also passed through the unit. Fog sensitivity was thus evaluated.

Evaluation on the development uneveness was based on the following criterions:

1 . . . No problem at all.

2 . . . No problem from the viewpoint of practical use.

3 . . . Too much uneveness to be of practical use.

The sensitivity was determined according to the common logarithm of a reciprocal of the amount of exposure required for giving the density of "fog+1.0", and expressed in a relative value, assuming as 100 the sensitivity obtained when developing processing was carried out using the developing solution of Sample No. 1.

Results obtained are shown in Table 1 below.

TABLE 1

| Sample No. | Surface active agent No. | Contact angle (°) | Surface tension (dyn/cm) | Development uneven-ness | Fog | Sensitivity | Water* content ($g/m^2$) | Remarks |
|---|---|---|---|---|---|---|---|---|
| 1 | None | 29 | 66 | 4 | 0.05 | 100 | 6 | X |
| 2 | 1 | 19 | 32 | 2 | 0.04 | 105 | 15 | Y |
| 3 | 10 | 14 | 28 | 1 | 0.03 | 110 | 20 | " |
| 4 | 11 | 18 | 30 | 2 | 0.04 | 105 | 16 | " |
| 5 | 17 | 17 | 31 | 1 | 0.04 | 98 | 6 | " |
| 6 | 20 | 15 | 29 | 1 | 0.03 | 99 | 5 | " |
| 7 | 22 | 18 | 25 | 2 | 0.03 | 105 | 12 | " |
| 8 | 29 | 13 | 23 | 1 | 0.04 | 110 | 25 | " |
| 9 | 31 | 12 | 22 | 1 | 0.04 | 110 | 27 | " |
| 10 | 34 | 14 | 27 | 1 | 0.03 | 105 | 13 | " |
| 11 | 35 | 15 | 30 | 1 | 0.03 | 98 | 6 | " |
| 12 | 37 | 17 | 29 | 2 | 0.04 | 99 | 8 | " |
| 13 | 42 | 12 | 25 | 1 | 0.03 | 100 | 7 | " |
| 14 | 44 | 14 | 28 | 1 | 0.04 | 100 | 8 | " |
| 15 | 47 | 15 | 30 | 2 | 0.05 | 110 | 33 | " |
| 16 | 48 | 12 | 24 | 1 | 0.03 | 105 | 10 | " |
| 17 | None | 29 | 66 | 4 | 0.04 | 90 | 4 | X |
| 18 | None | 29 | 66 | 4 | 0.10 | 120 | 43 | " |
| 19 | 9 | 12 | 22 | 1 | 0.08 | 120 | 45 | " |
| 20 | 37 | 17 | 29 | 2 | 0.03 | 88 | 4 | " |

*Water content present in the samples at the time the developing is completed.
X: Comparative Example, Y: Present Invention Table 1 shows that the contact angle lowered to 20° or less brings about an improvement in the development uneveness without adversely affecting the sensitometric characteristics.

As described in the above, the present invention can achieve an improvement in the stability of the developing solution, and greatly suppress the development uneveness to give an image with superior photographic performance.

What is claimed is:

1. A method of forming an image comprising exposing a light-sensitive silver halide photographic material having a support and hydrophilic colloid layers provided on both sides of the support and developing the exposed material with a developing solution containing water and hydroquinone or hydroquinone derivatives without immersing the exposed material in the developing solution, wherein the water content of the material is 5 to 40 $g/m^2$ at the time development is completed.

2. The method of claim 1, wherein the contact angle of the material to the developing solution is not more than 20° at 25° C.

3. The method of claim 1, wherein the contact angle of the material to the developing solution is in the range of 10° to 20° at 25° C.

4. The method of claim 1, wherein the temperature of the developing solution is in the range of 20° to 50° C.

5. The method of claim 1, wherein the temperature of the developing solution is in the range of 30° to 40° C.

6. The method of claim 1, wherein the development period is in the range of 5 to 60 seconds.

7. The method of claim 1, wherein the development period is in the range of 5 to 30 seconds.

8. The method of claim 1, wherein the hydroquinone derivatives are chlorohydroquinone or methylhydroquinone.

9. The method of claim 1, wherein the content of hydroquinone or hydroquinone derivatives in the developing solution is 1 to 35 g per liter of the solution.

10. The method of claim 1, wherein the content of hydroquinone or hydroquinone derivatives in the developing solution is 5 to 30 g per liter of the solution.

11. The method of claim 1, wherein the surface tension of the developing solution is not more than 45 dyn/cm at 30° C.

12. The method of claim 1, wherein the surface tension of the developing solution is not more than 40 dyn/cm at 30° C.

13. The method of claim 1, wherein the developing solution further contains at least one surfactant selected from the group consisting of an anion, a cation and an amphoteric surfactant.

14. The method of claim 13, wherein the surfactant content of the developing solution is 0.01 to 50 g/l.

15. The method of claim 13, wherein the surfactant content of the developing solution is 0.05 to 30 g/l.

16. The method of claim 1, wherein development is carried out by feeding the developing solution to the material transported in a downward direction.

* * * * *